(12) United States Patent
Dreano

(10) Patent No.: US 11,511,342 B2
(45) Date of Patent: Nov. 29, 2022

(54) METHOD OF FABRICATING AN AIRFOIL PREFORM, AN AIRFOIL, AND A NOZZLE SECTOR, BY SELECTIVE MELTING ON A BED OF POWDER

(71) Applicant: SAFRAN AIRCRAFT ENGINES, Paris (FR)

(72) Inventor: Sébastien Dreano, Longjumeau (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 191 days.

(21) Appl. No.: 17/070,378

(22) Filed: Oct. 14, 2020

(65) Prior Publication Data

US 2021/0039170 A1 Feb. 11, 2021

Related U.S. Application Data

(62) Division of application No. 15/776,641, filed as application No. PCT/FR2016/052928 on Nov. 10, 2016, now Pat. No. 10,843,270.

(30) Foreign Application Priority Data

Nov. 17, 2015 (FR) ...................................... 1561021

(51) Int. Cl.
*B33Y 80/00* (2015.01)
*F01D 5/14* (2006.01)
(Continued)

(52) U.S. Cl.
CPC ................ *B22F 5/009* (2013.01); *B22F 5/04* (2013.01); *B22F 10/00* (2021.01); *B22F 10/20* (2021.01);
(Continued)

(58) Field of Classification Search
CPC .. B22F 5/009; B22F 5/04; B22F 10/00; B22F 10/20; B22F 2003/247; B22F 10/40;
(Continued)

(56) References Cited

U.S. PATENT DOCUMENTS 9,175,568 B2 11/2015 Ryan et al.
2008/0155802 A1 7/2008 Luna et al.
(Continued)

FOREIGN PATENT DOCUMENTS

CN 101254583 A 9/2008
CN 101855061 A 10/2010
(Continued)

OTHER PUBLICATIONS

International Search Report as issued in International Patent Application No. PCT/FR2016/052926, dated Feb. 13, 2017.

*Primary Examiner* — Rebecca Janssen
(74) *Attorney, Agent, or Firm* — Pillsbury Winthrop Shaw Pittman LLP

(57) ABSTRACT

A method of fabricating an airfoil preform for a turbine engine by selective melting on a bed of powder, the preform including an airfoil and a removable support secured to the airfoil, the airfoil being fabricated layer by layer from a first edge to a second edge of the airfoil, the method including fabricating the removable support and the airfoil, the removable support being for securing to a fabrication platform and to a portion of a face of the airfoil situated near the first edge and facing the fabrication platform. The face of the airfoil facing the fabrication platform includes a flat extending away from the face, the flat being present over a portion of the face that is situated outside the first edge, the support being secured to the flat or both to the flat and to the portion of the face that is situated outside the first edge.

2 Claims, 3 Drawing Sheets

(51) Int. Cl.

| | | |
|---|---|---|
| *F01D 9/04* | (2006.01) | |
| *B22F 5/00* | (2006.01) | |
| *B22F 5/04* | (2006.01) | |
| *B33Y 10/00* | (2015.01) | |
| *B29C 64/40* | (2017.01) | |
| *B29C 64/153* | (2017.01) | |
| *B22F 10/20* | (2021.01) | |
| *B22F 10/00* | (2021.01) | |
| *B23K 26/342* | (2014.01) | |
| *B23P 15/04* | (2006.01) | |
| *B22F 3/24* | (2006.01) | |
| *B23K 101/00* | (2006.01) | |

(52) U.S. Cl.
CPC .......... *B23K 26/342* (2015.10); *B29C 64/153* (2017.08); *B29C 64/40* (2017.08); *B33Y 10/00* (2014.12); *B33Y 80/00* (2014.12); *F01D 5/14* (2013.01); *F01D 9/044* (2013.01); *B22F 2003/247* (2013.01); *B23K 2101/001* (2018.08); *B23P 15/04* (2013.01); *F05D 2230/20* (2013.01); *F05D 2230/22* (2013.01); *Y02P 10/25* (2015.11)

(58) Field of Classification Search
CPC ............ B23K 26/342; B23K 2101/001; B29C 64/153; B29C 64/40; B33Y 10/00; B33Y 80/00; F01D 5/14; F01D 9/044; B23P 15/04; F05D 2230/20; F05D 2230/22; Y02P 10/25

See application file for complete search history.

(56) References Cited

U.S. PATENT DOCUMENTS

| | | |
|---|---|---|
| 2009/0072447 A1 | 3/2009 | Hull et al. |
| 2013/0112366 A1 | 5/2013 | Mottin et al. |
| 2013/0199013 A1 | 8/2013 | Graichen |
| 2014/0262124 A1 | 9/2014 | Vilaro et al. |
| 2014/0271221 A1* | 9/2014 | Soucy .................. B29C 64/153 264/157 |
| 2015/0314534 A1 | 11/2015 | Yakubov et al. |
| 2016/0243620 A1* | 8/2016 | Butcher .................. B23H 9/10 |

FOREIGN PATENT DOCUMENTS

| | | |
|---|---|---|
| CN | 102971099 A | 3/2013 |
| CN | 103068516 A | 4/2013 |
| CN | 103906591 A | 7/2014 |
| CN | 103920877 A | 7/2014 |
| CN | 104368814 A | 2/2015 |
| WO | WO 2014/124969 A1 | 8/2014 |
| WO | WO 2015/058043 A1 | 4/2015 |
| WO | WO 2015/088852 A1 | 6/2015 |

* cited by examiner

METHOD OF FABRICATING AN AIRFOIL PREFORM, AN AIRFOIL, AND A NOZZLE SECTOR, BY SELECTIVE MELTING ON A BED OF POWDER

CROSS-REFERENCE TO RELATED APPLICATIONS

This application is a divisional of U.S. application Ser. No. 15/776,641, filed May 16, 2018, which is the U.S. National Stage of PCT/FR2016/052928, filed Nov. 10, 2016, which in turn claims priority to French patent application number 1561021, filed Nov. 17, 2015. The content of these applications are incorporated herein by reference in their entireties.

BACKGROUND OF THE INVENTION

The present invention relates to the general field of additive fabrication methods. The present invention relates more particularly to a method of fabricating turbine engine airfoils by selective melting on a bed of powder.

Nowadays it is common practice and advantageous to have recourse to additive fabrication techniques for making complex three-dimensional parts easily and quickly. The field of aviation is particularly suitable for the use of methods of this type.

When fabricating parts out of metal or metal alloy, the method of selective melting on a bed of powder makes it possible to obtain complex parts that are difficult or impossible to make using conventional methods such as casting, forging, or machining.

Such a method typically comprises a step during which a layer of powder is deposited on a fabrication platform, followed by a step of selectively melting a portion of the deposited layer of powder by using a heater member. The above steps are repeated in succession so as to build up the final part layer by layer.

FIG. 1 shows a turbine nozzle sector 1 for an aviation turbine engine comprising a plurality of stationary airfoils 2 extending between two concentric rings 3 and 4 that are arranged on a horizontal fabrication platform 5. When the nozzle is in such a configuration, the airfoils 2 are "suspended", i.e. they are cantilevered out from the rings 3 and 4.

When it is desired to fabricate such a nozzle sector 1 by selective melting on a bed of powder, it is necessary during fabrication to provide removable or breakable supports 6 (see FIG. 1) that hold the airfoils while they are being fabricated. Specifically, in methods of selective melting on a bed of powder, it is essential for each melted layer to be capable of being held up by material that has already previously been melted. Such supports 6 are inevitably present at the leading edge or the trailing edge of the airfoils 2 (depending on whether the nozzle sector is fabricated one way up or the other), and also on a portion of the faces 2a of the airfoils facing the fabrication platform 5 (see FIG. 5).

Nevertheless, the presence of such removable supports at the leading edge or the trailing edge is not desirable. Specifically, once the nozzle sector has been fabricated in the tooling for selective melting on a bed of powder, and then separated from the fabrication platform, it is necessary to remove the removable support. A manual polishing step is needed to eliminate the residues of those supports. During the manual polishing, the operator needs to move the polishing tool over the edge where the supports were present (corresponding to the leading edge or the trailing edge of the airfoil) and to press thereagainst. Manual polishing can thus lead to shape defects and irregularities for the edge in question as a result of excessive removal of material. Such defects may turn out to be problematic for the aerodynamics of the airfoils during subsequent use in a turbine engine.

OBJECT AND SUMMARY OF THE INVENTION

A main object of the present invention is thus to mitigate such drawbacks by proposing a method of fabricating an airfoil preform for a turbine engine by selective melting on a bed of powder, the preform comprising an airfoil and at least one removable support secured to the airfoil, the airfoil being fabricated layer by layer from a first edge of the airfoil corresponding to a leading edge or to a trailing edge of an airfoil to a second edge of the airfoil corresponding to a trailing edge or a leading edge of the airfoil, the method comprising fabricating the removable support and the airfoil, said removable support being for securing firstly to a fabrication platform and secondly to a portion of a face forming a pressure side or a suction side of the airfoil situated in the vicinity of the first edge of the airfoil and facing said fabrication platform.

In accordance with the invention, the face forming a pressure side or a suction side of the airfoil and facing the fabrication platform includes a flat extending away from said face, the flat being present over a portion of said face that is situated outside the first edge of the airfoil, the removable support being secured to the flat or both to the flat and to the portion of said face that is situated outside the first edge.

The method of the invention is remarkable in that during fabrication of the airfoil preform, the method incorporates fabricating a flat at the first edge of the airfoil (which first edge may correspond to a leading edge or to a trailing edge depending on the orientation of the airfoil in the tooling for selective melting on a bed of powder). The presence of this flat advantageously enables the portion of the airfoil to which the removable support is attached to be spaced apart from the first edge under consideration. In other words, the removable support is set back from the first edge of the airfoil. When the removable support is subsequently removed in order to obtain the airfoil, residue of the support is located on the flat and possibly on a portion of the face of the airfoil that faces the fabrication platform, but not directly on the first edge. Thus, when polishing the airfoil in order to remove the residue, the operator need no longer press against the first edge of the airfoil, but rather on the flat and on the face of the airfoil in the vicinity of which the flat is present. Such a configuration thus serves to limit the appearance of defects due to removing supports by ensuring that the airfoil is polished in uniform and controlled manner. In addition, the time required for adjusting or polishing the airfoil is reduced by such a technique, by making this step more systematic. Naturally, techniques other than polishing could be used for adjusting the shape of the airfoil after the supports have been removed.

Preferably, the flat comprises a first face parallel to the fabrication platform and tangential to the first edge of the airfoil. For example, the first face may form an angle that is less than or equal to 5° relative to the fabrication platform. Since the part is built up layer by layer, each layer being parallel to the fabrication platform, this means that the first layer forming the airfoil presents an area, e.g. a rectangular area. It is advantageous for the first layer to be an area rather than a line in order to provide better holding of the airfoil, in particular at its first edge.

Also preferably, the flat further comprises a second face perpendicular to the first face. For example, the second face may form an angle lying in the range 85° to 95° relative to the first face. Under such circumstances, a point of the flat at the intersection between the first and second faces of said flat may be situated at a distance from the face of the airfoil facing the fabrication platform that is less than or equal to 0.5 millimeters (mm), e.g. less than or equal to 0.3 mm. More generally, the flat may be integrated in the airfoil in such a manner that it does not exceed the acceptable level of shape defects for the airfoil (as set out in specifications, for example), or in other words, for it to comply with the requirements for the shape of the airfoil. Thus, when the flat is constructed in this way its dimensions are smaller than the dimensions of an acceptable shape defect for the airfoil, so removing it subsequently, e.g. by machining, can become optional.

The removable support may be a cellular support.

The invention also provides a method of fabricating a turbine engine airfoil, the method comprising the following steps:
fabricating an airfoil preform by a method as described above; and
removing the removable support and the flat from the airfoil preform.

Preferably, removing the removable support and the flat comprises polishing the airfoil.

The invention also provides a method of fabricating a turbine engine nozzle sector by selective melting on a bed of powder, the nozzle sector comprising a plurality of stationary airfoils carried by two ring sectors, the stationary airfoils being fabricated by an airfoil fabrication method as described above.

Finally, the invention provides a turbine engine airfoil preform comprising an airfoil and at least one removable support secured to the airfoil, one of the faces of the airfoil forming a pressure side or a suction side including a flat extending from said face, the flat being present over a portion of said face situated outside a first edge of the airfoil corresponding to the leading edge or to the trailing edge of the airfoil, the removable support being secured to the flat or both to the flat and to a portion of said face situated outside the first edge.

Preferably, the flat has a first face that is tangential to the first edge of the airfoil and a second face that is substantially perpendicular to the first face.

BRIEF DESCRIPTION OF THE DRAWINGS

Other characteristics and advantages of the present invention appear from the following description made with reference to the accompanying drawings. In the figures.

DETAILED DESCRIPTION OF THE INVENTION

Figure 1:
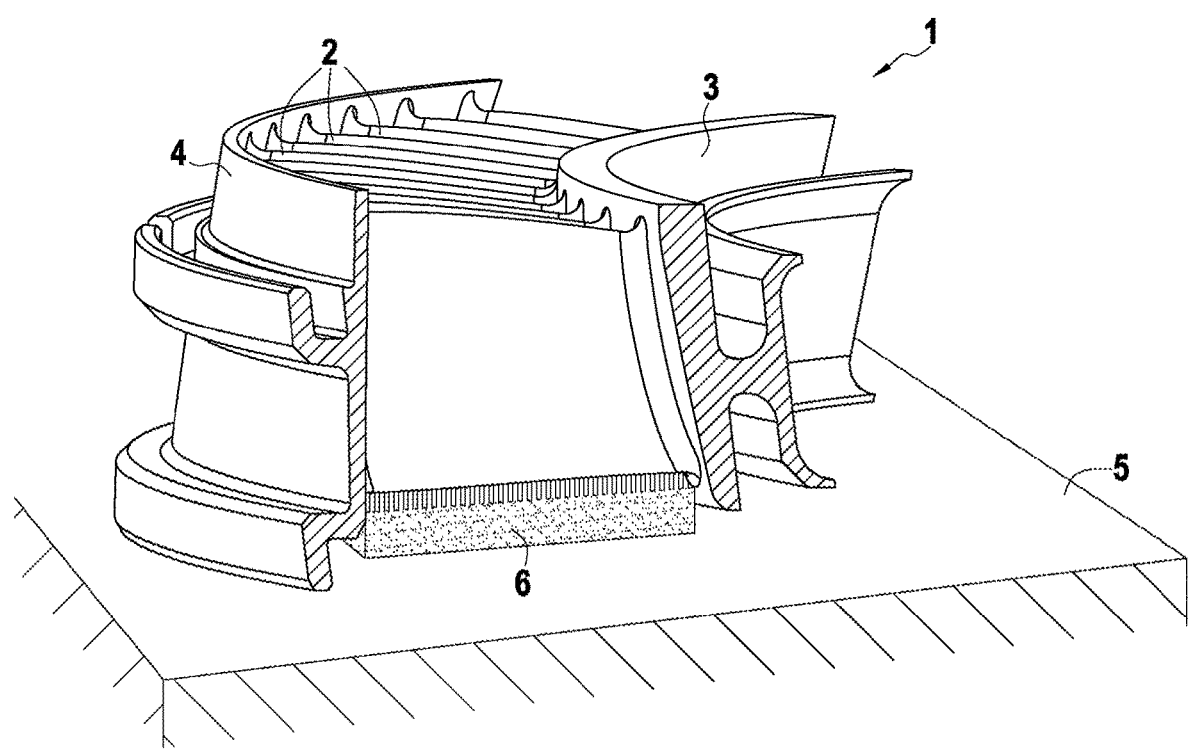
FIG. 1 is a perspective view of a nozzle sector suitable for being fabricated by a method of the invention.

FIG. 1 shows a nozzle sector 1 or guide vane set of a turbine for an aviation turbine engine, as described above. Such a nozzle sector 1 may be fabricated by a method of the invention by selective melting on a bed of powder. A step of the fabrication method includes fabricating airfoils 2 of the nozzle sector 1 (i.e. its vanes). It should be observed that the invention applies to airfoils for turbine engines equally well whether the engines are terrestrial or for aviation.

Figure 2:
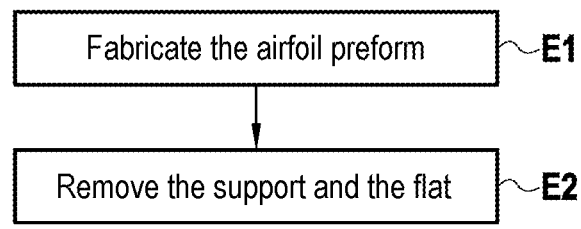
FIG. 2 is a flow chart showing the main steps of a method of the invention for fabricating an airfoil.

A method of the invention for fabricating an airfoil 2 is described below with reference to the flow chart of FIG. 2 and the tooling for selective melting shown in FIGS. 3 and 4. Such a method comprises initially fabricating an airfoil preform (step E1), and then removing (step 2) the removable support 6 from the preform in order to obtain the airfoil. The support 6 is thus said to be "removable" since it is designed to be removed from the airfoil 2 after it has been fabricated by a method of the invention.

Figure 3:
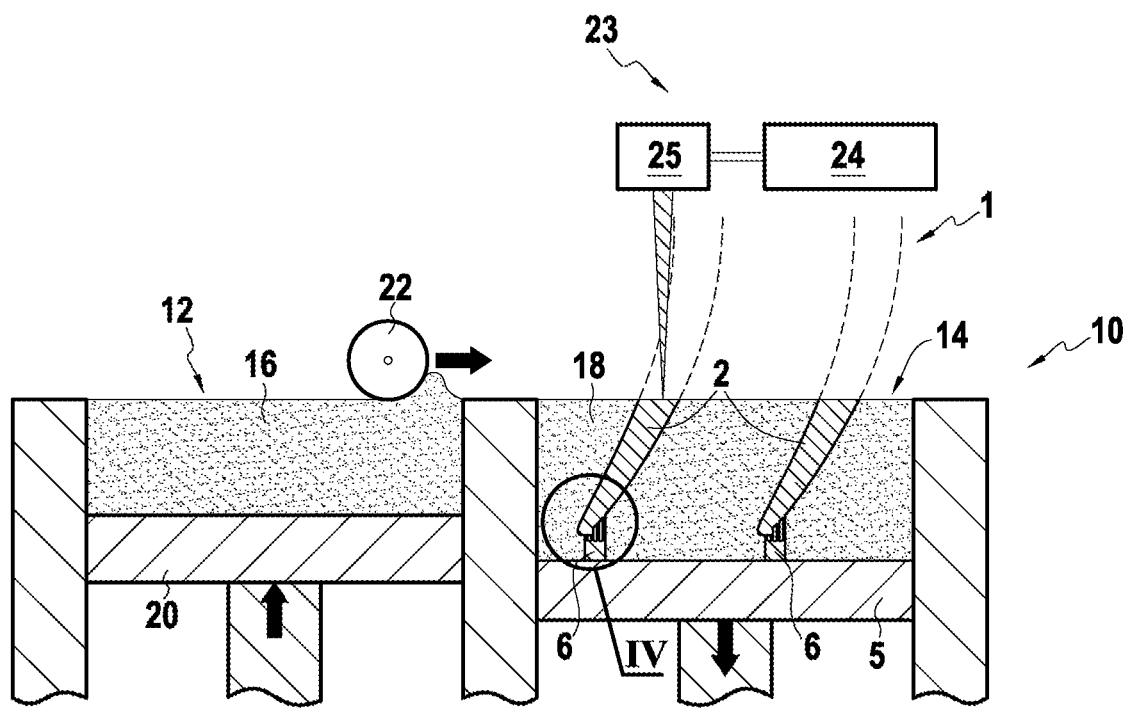
FIG. 3 is a diagrammatic section view of tooling for selective melting on a bed of powder in which a nozzle sector is fabricated.

FIG. 3 shows tooling 10 for selective melting on a bed of powder suitable for use in fabricating a nozzle sector 1 having a plurality of stationary airfoils 2. For simplification purposes, the tooling 10 is shown in section during fabrication of a nozzle sector 1 that comprises only two airfoils 2.

In known manner, the tooling 10 has a supply of powder 12 and a fabrication zone 14 in which the nozzle sector 1 is fabricated. The supply of powder 12 contains the metal powder 16 or metal alloy powder that is to be used for fabricating the nozzle sector 1, while the zone 14 is suitable for containing the nozzle sector 1 once it has been fabricated, together with the powder 18 that has not been melted.

At the bottom of the powder supply 12 there is a platform 20 suitable for moving vertically in order to deliver powder to a scraper or roller 22 that can subsequently push the powder to the fabrication zone 14 so as to a form a layer of powder. At the bottom of the fabrication zone 14 there is a fabrication platform 5 suitable for moving vertically progressively as the nozzle sector 1 is fabricated. The scraper or roller 22 constituting powder spreader means serves to deposit a layer of powder on the fabrication platform 5.

Finally, the tooling 10 includes a heater member 23 having a generator portion 24 for generating a laser beam or an electron beam, and a control portion 25 for controlling the path followed by the generated beam so as to melt selectively a layer of powder deposited on the fabrication zone 14.

For each airfoil 2, provision is made to fabricate a removable support 6 that is secured firstly to the fabrication platform 5 and secondly to the airfoil 2, thereby enabling the airfoil 2 to be held throughout the fabrication method. An airfoil preform is thus fabricated that comprises an airfoil 2 and its removable support 6.

Figure 4:
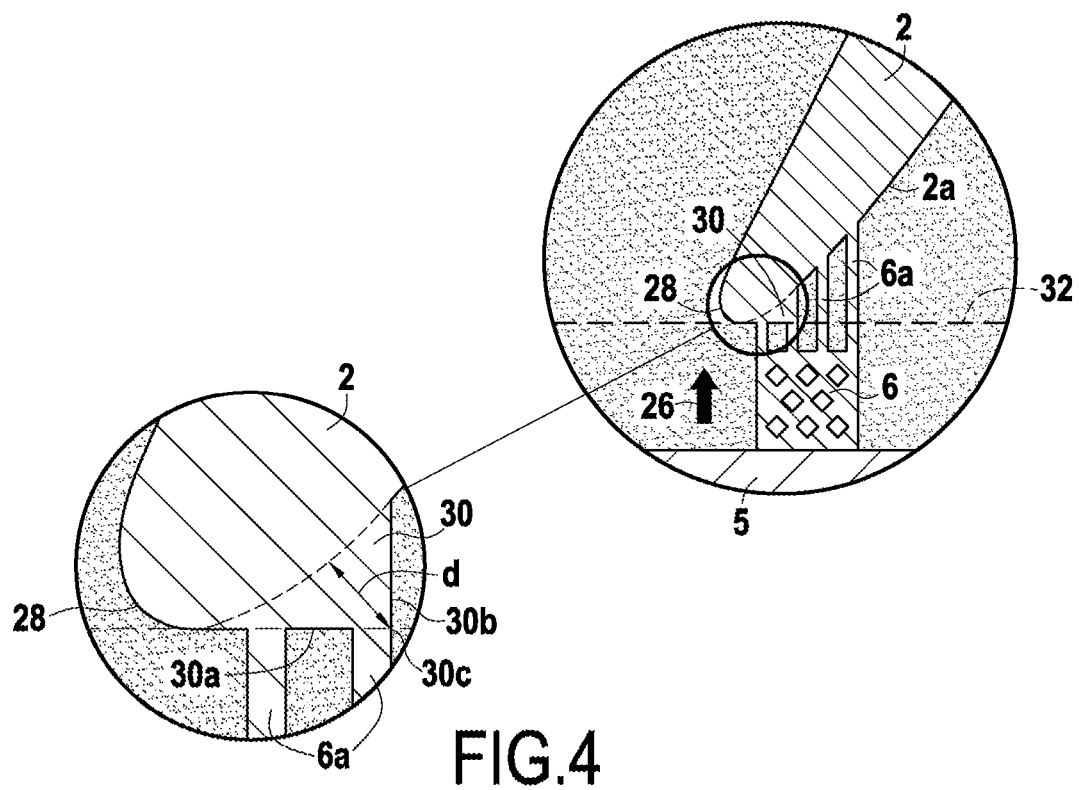
FIG. 4 is a detail view of FIG. 3 at the first edge of an airfoil together with its removable support.

FIG. 4 is an enlarged diagrammatic view of an airfoil preform in the fabrication zone 14 in the vicinity of the removable support 6. In this example the airfoil preform is fabricated in the direction indicated by arrow 26. The fabrication of the airfoil preform begins with the support 6, followed by fabricating the airfoil 2, beginning with a first edge 28 thereof (corresponding to the trailing edge of the airfoil in this example) and continuing to a second edge thereof (corresponding in this example to the leading edge of the airfoil, not shown). As can be seen in the figures, the first edge 28 is situated facing the fabrication platform 5, while the second edge is situated remote from the fabrication platform 5. In addition, the first edge 28 and the second edge are generally parallel to the top surface of the fabrication platform.

In accordance with the invention, a flat 30 is formed on the airfoil 2, and more precisely on a face 2a of the airfoil and at the first edge 28 of the airfoil. This flat 30 extends from the vicinity of the first edge 28 and away from the first edge 28 beside the face 2a of the airfoil that faces the fabrication platform 5 (in this example this face is the suction side of the airfoil). In the example shown, the flat 30 has a first face 30a substantially parallel to the fabrication platform 5 and tangential to the first edge 28 of the airfoil, and a second face 30b substantially perpendicular to the first face 30a. In this configuration, a point 30c situated at the intersection between the two faces is at a distance d from the face 2a of the airfoil. This distance d is preferably less than or equal to 0.5 mm, or indeed less than or equal to 0.3 mm, in order to comply with the acceptable level of shape defects for the airfoil 2. In general, the distance d may be selected to be less than or equal to the acceptable level of shape defects for the airfoil 2, where the shape defect is generally defined by specifications.

In this example, the removable support 6 comprises a plurality of ridges 6a (or tabs) for supporting the airfoil 2. These ridges 6a are secured on a portion of the airfoil 2 that extends from the flat 30 to the face 2a of the airfoil and in a direction going away from the first face 28. The ridges 6a may be secured to the flat and set back from the first edge 28 of the airfoil, i.e. the ridges 6a are not positioned exactly at the first edge of the airfoil but are spaced apart therefrom. In an embodiment that is not shown, the ridges 6a may be secured on a portion extending from the middle of the face 30a of the flat 30 and as far as the face 2a of the airfoil.

It should be observed that, at the end of step E1, the support 6, the flat 30, and the airfoil 2 form a single part (referred to herein as the airfoil "preform").

The removable support 6 is preferably of cellular type. In general manner, the removable support 6 need not be solid, for example it may be hollow. This avoids consuming too much material during the fabrication method, since the support 6 ends up being removed from the airfoil preform.

Dashed line 32 in FIG. 4 represents the first layer constituting the airfoil, and it can be seen that the melted portion of this first layer that begins fabrication of the airfoil 2 forms a plane as a result of the presence of the flat 30. Obtaining a first airfoil layer that is constituted by a plane is advantageous. Specifically, in additive fabrication, in order to minimize fabrication defects, it is appropriate to avoid as much as possible beginning a part by melting a single line. Furthermore, by beginning the fabrication of the airfoil 2 with a plane, it is held better by the support 6.

Once the airfoil preform has been fabricated (or a plurality of preforms for a nozzle or a guide vane set), the removable support 6 can be removed by cutting through the ridges 6a (step E2). The residues of the ridges 6a of the support 6 that remain together with the flat 30 are subsequently eliminated, e.g. using a polishing tool of the grinder type. The presence of the flat 30 makes it possible to avoid resting the polishing tool against the first edge 28 during this step. Specifically, it is possible instead to position the polishing tool against the flat 30 and at the face 2a so as to avoid damaging the first edge 28. Furthermore, it is found to be easier to press the polishing tool against the face 2a instead of against the first edge 28. The presence of the flat then makes it possible to obtain airfoils having first edges 28 that are regular and that do not present defects greater than defects that are acceptable as defined by specifications.

It should be observed that it would not go beyond the ambit of the invention for a plurality of supports 6 to be used for supporting an airfoil 2.

Figure 5:
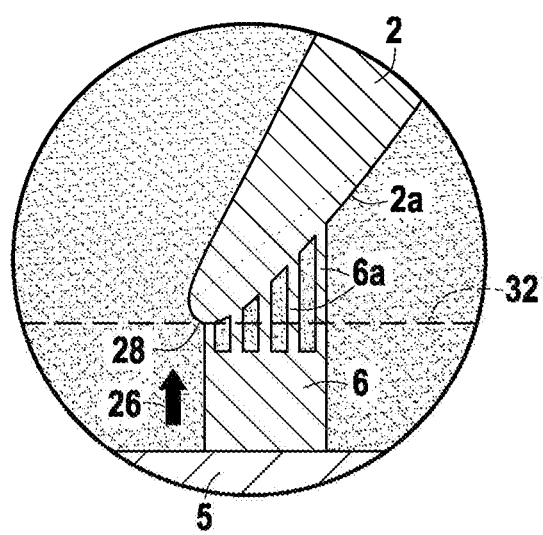
FIG. 5 is a view similar to the view of FIG. 3, showing a prior art method.

By way of comparison, the positioning of a removable support 6 as may be done in the prior art is shown in FIG. 5. In that configuration, at least one ridge 6a of the support 6 is positioned at the first edge 28 in order to be able to hold the airfoil correctly while it is being fabricated. In addition, the first layer forming the airfoil 2 (represented by dashed line 32) is constituted by a line, which is not desirable for the reasons mentioned above. After the support 6 has been cut away, at least some residue of ridges 6a is inevitably positioned at the first edge 28. The presence of this residue makes the steps of adjusting and polishing the airfoil more difficult, and can lead to defects at the edge and to irregularity in the set of airfoils 2 as fabricated.

The invention claimed is:

1. A turbine engine airfoil preform comprising an airfoil and at least one removable support secured to the airfoil, the preform being wherein one of the faces of the airfoil forming a pressure side or a suction side includes a flat extending from said face, the flat being present over a portion of said face situated outside a first edge of the airfoil corresponding to the leading edge or to the trailing edge of the airfoil, the removable support being secured to the flat or both to the flat and to a portion of said face situated outside the first edge.

2. A preform according to claim 1, wherein the flat has a first face that is tangential to the first edge of the airfoil and a second face that is substantially perpendicular to the first face.

\* \* \* \* \*